(12) United States Patent
Payyapilli

(10) Patent No.: US 12,358,651 B1
(45) Date of Patent: Jul. 15, 2025

(54) SPACECRAFT WITH RETRACTABLE SOLAR SAILS

(71) Applicant: George Payyapilli, Floral Park, NY (US)

(72) Inventor: George Payyapilli, Floral Park, NY (US)

( * ) Notice: Subject to any disclaimer, the term of this patent is extended or adjusted under 35 U.S.C. 154(b) by 0 days.

(21) Appl. No.: 18/383,018

(22) Filed: Oct. 23, 2023

(51) Int. Cl.
*B64G 1/40* (2006.01)
*B64G 1/22* (2006.01)

(52) U.S. Cl.
CPC ............ *B64G 1/407* (2013.01); *B64G 1/2229* (2023.08)

(58) Field of Classification Search
CPC .............................. B64G 1/407; B64G 1/2229
See application file for complete search history.

(56) References Cited

U.S. PATENT DOCUMENTS

| 9,550,584 B1 * | 1/2017 | Harvey ................. B64G 1/2229 |
| 2011/0219893 A1 * | 9/2011 | Fiala ........................ F03G 7/115 74/5.34 |

* cited by examiner

*Primary Examiner* — Valentina Xavier

(57) ABSTRACT

A spacecraft with retractable solar sails is a spacecraft that is designed as a semi-autonomous spacecraft that can maneuver and propel using radiation pressure. The spacecraft includes a spherical hull and several propulsion mechanisms. The spherical hull houses the propulsion mechanisms, the payload, and other systems that enable the semi-autonomous operation of the spacecraft. The spherical hull also enables the semi-autonomous operation of the propulsion mechanisms. The propulsion mechanisms enable the propulsion and maneuvering of the spacecraft using radiation pressure in deep space. Each of the propulsion mechanisms includes a solar sail assembly, a sail receptacle, a pneumatic actuator, and a quantity of fluid. The solar sail assembly supports several retractable solar sails. The sail receptacle allows the retraction of the solar sail assembly into the spherical hull. The pneumatic actuator allows the deployment of the solar sail assembly. The quantity of fluid enables the operation of the pneumatic actuator.

15 Claims, 10 Drawing Sheets

SPACECRAFT WITH RETRACTABLE SOLAR SAILS

FIELD OF THE INVENTION

The present invention relates generally to spacecraft and control systems. More specifically, the present invention discloses a spacecraft equipped with retractable solar sails that enable automatic maneuverability of the spacecraft.

BACKGROUND OF THE INVENTION

Space systems have vastly improved during the last decades due to the advances in space technology. For example, spacecraft systems have been developed that utilize reusable rockets to reduce operational costs. However, operational costs are still highly elevated which limits the unrestricted development of space systems. One of the most expensive aspects of space systems involves the propulsion system utilized for the spacecrafts. The propulsion system not only allows the spacecraft to exit the Earth's atmosphere and enter the target orbit, but the propulsion system also facilitates the spacecraft to perform different maneuvers in space. Existing propulsion technologies allow for limited maneuverability in space due to the restricted amount of fuel that the spacecraft can carry along with the payload. So, other propulsion alternatives have been developed that are not restricted by traditional fuel sources such as electric propulsion systems. Other propulsion system alternatives have been developed that take advantage of radiation pressure to propel the spacecraft. This propulsion technology has been commonly implemented in the form of solar sails. However, solar sail technologies have very limited functionality which prevents solar sails from being used to the fullest potential. Therefore, there is a need for a space system that better integrates solar sails for propulsion and maneuverability of the spacecraft.

An objective of the present invention is to provide a spacecraft with retractable solar sails that utilizes solar sails for propulsion and maneuverability purposes. The present invention implements solar sails in a unique manner that allows the spacecraft to be propelled using the radiation pressure in space. The solar sails also enable the maneuverability of the spacecraft without the need for additional fuel sources that limit the spacecraft's mission. Another objective of the present invention is to provide a spacecraft with retractable solar sails that can be automatically deployed in predetermined conditions. The present invention can be designed to automatically deploy or retract specific solar sails once the spacecraft has reached certain atmospheric conditions. Thus, the present invention can operate in a semi-autonomous manner under predetermined parameters. Additional features and benefits of the present invention are further disclosed in the sections below.

SUMMARY OF THE INVENTION

The present invention discloses a spacecraft with retractable solar sails that eliminates the need for traditional space propulsion systems. The present invention is designed to utilize several solar sails as means of propulsion as well as to facilitate the maneuvering of the spacecraft in space. The spacecraft is preferably a spherical structure large enough to retain the desired payload, the propulsion system of the spacecraft, and other spacecraft systems. The propulsion system of the present invention includes several solar sails distributed about the spherical-shaped structure of the spacecraft. Further, each solar sail is designed as a retractable structure that is automatically deployed once the spacecraft reaches predetermined atmospheric conditions, such as the vacuum of deep space or other low-pressure conditions. Likewise, each solar sail can be automatically retracted once the spacecraft reaches other predetermined atmospheric conditions, such as the Earth's atmosphere or other high-pressure conditions.

Furthermore, the propulsion system of the present invention is designed to automatically deploy and retract the solar sails by utilizing a pneumatic mechanism that does not require fuel or external power for operation. In some embodiments, the propulsion system of the present invention can be designed to selectively deploy or retract selected solar sails to propel the spacecraft in specific directions or to facilitate the maneuvering of the spacecraft. Thus, the spacecraft can operate in a semi-autonomous manner according to predetermined mission requirements without the need for external fuel sources or other propulsion systems. In other embodiments, additional control mechanisms can be provided to help control the deployment and retraction of the propulsion system of the present invention.

DETAIL DESCRIPTIONS OF THE INVENTION

Figure 1:
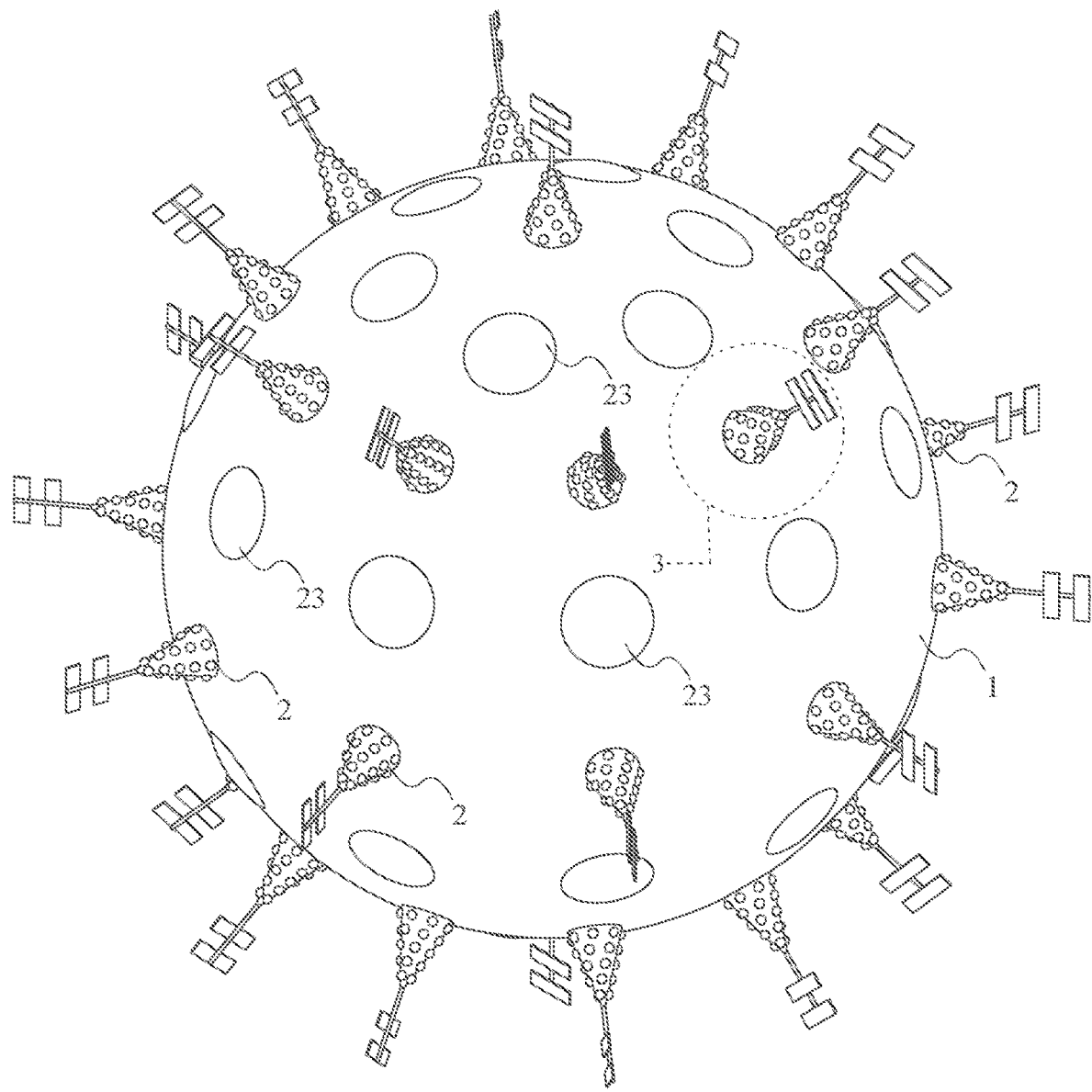
FIG. 1 is a top front perspective view of the present invention, wherein a plurality of propulsion mechanisms of the present invention are shown in a deployed configuration.
Figure 2:
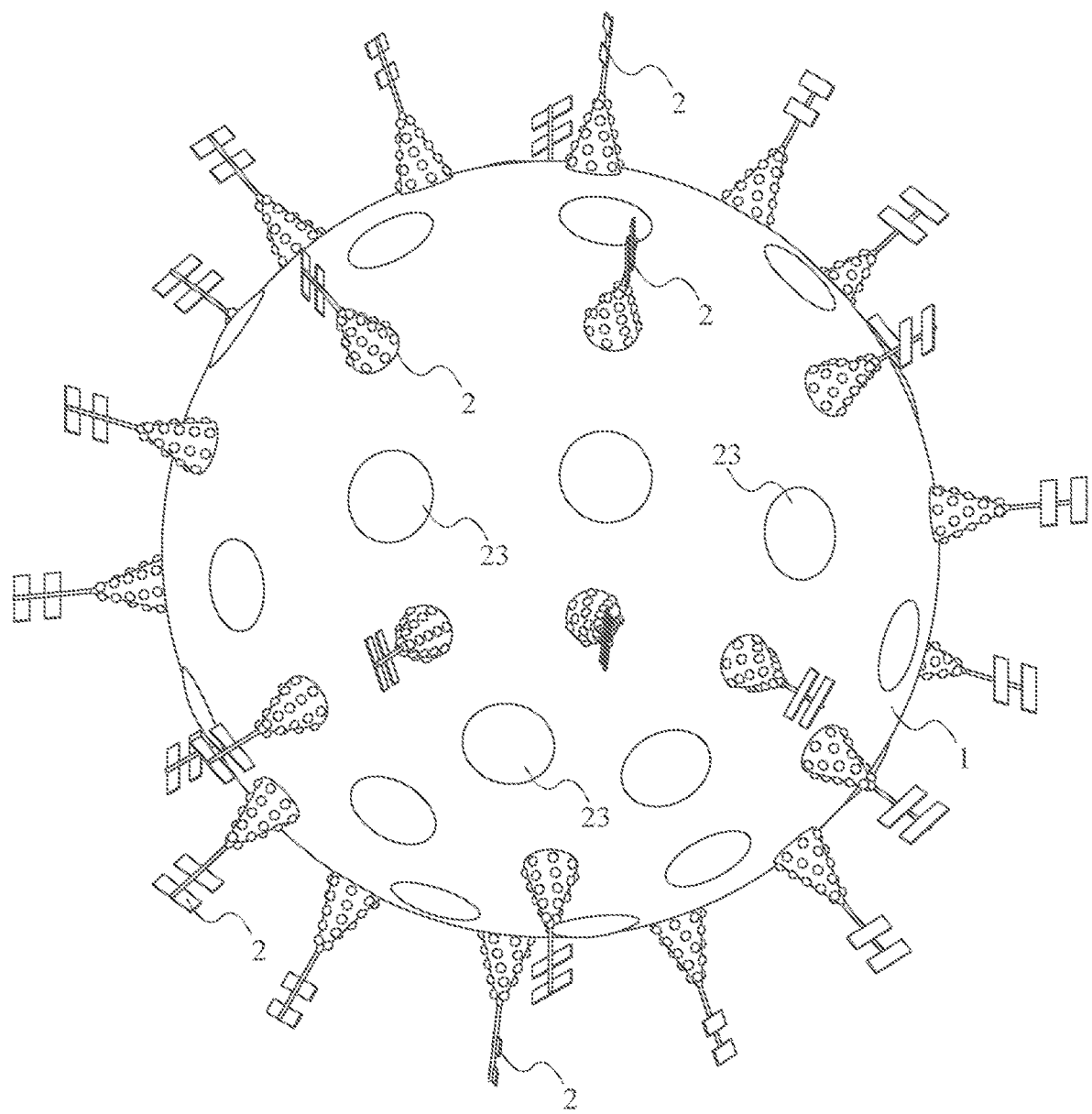
FIG. 2 is a bottom rear perspective view of the present invention.
Figure 3:
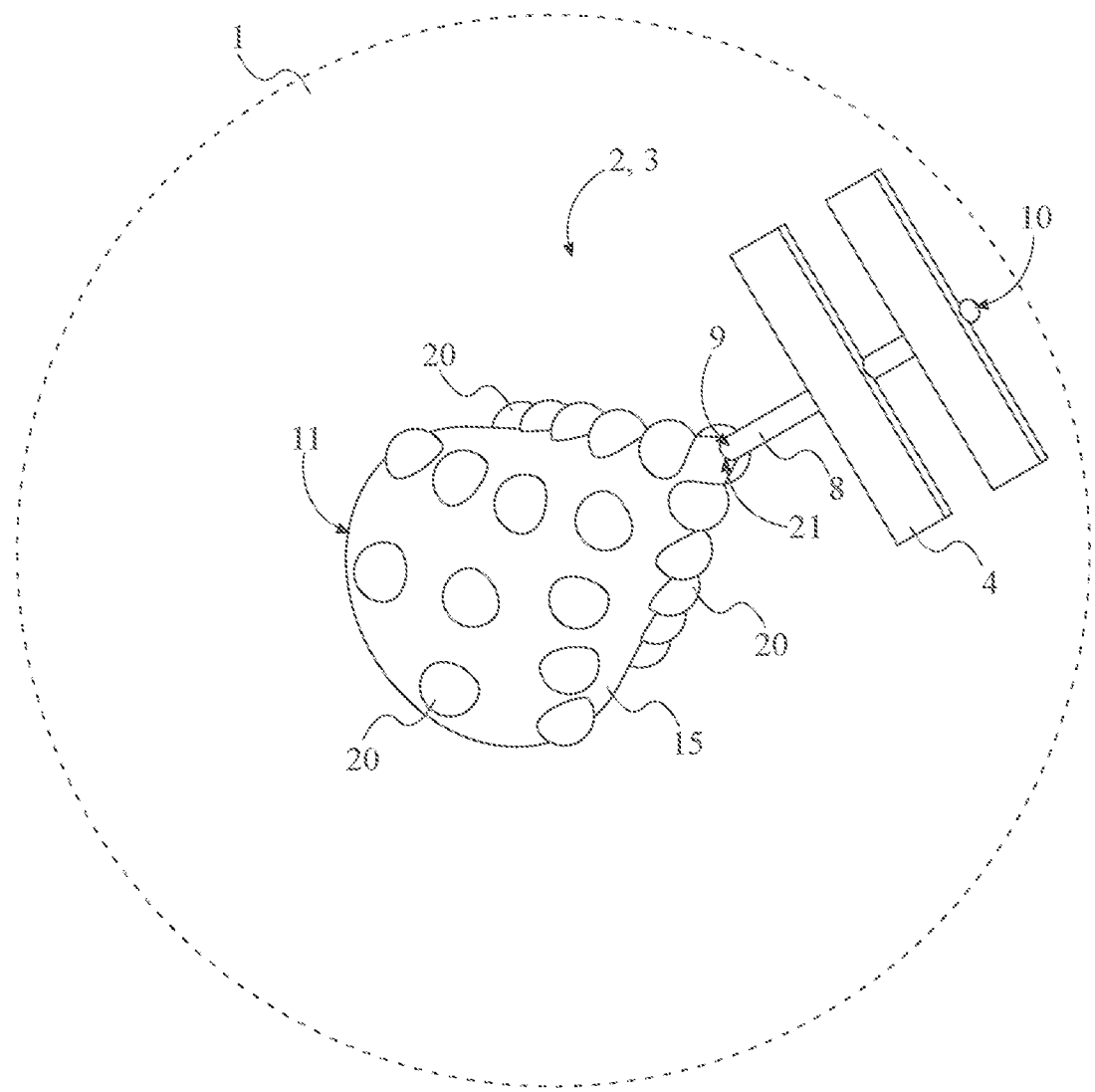
FIG. 3 is a magnified view of a propulsion mechanism of the plurality of propulsion mechanisms shown in FIG. 1.

All illustrations of the drawings are for the purpose of describing selected versions of the present invention and are not intended to limit the scope of the present invention.

The present invention is a spacecraft with retractable solar sails. The spacecraft with retractable solar sails is designed as a semi-autonomous spacecraft that can maneuver and propel through space using radiation pressure. As can be seen in FIGS. 1 through 10, the present invention comprises a spherical hull 1 and a plurality of propulsion mechanisms 2. The spherical hull 1 corresponds to the main structure of the spacecraft that houses the plurality of propulsion mechanisms 2, the payload, as well as the other systems that enable the semi-autonomous operation of the spacecraft. The spherical hull 1 is also designed to enable the semi-autonomous operation of the plurality of propulsion mechanisms 2. The plurality of propulsion mechanisms 2 enables the propulsion and maneuvering of the spacecraft using radiation pressure in deep space. The plurality of propulsion mechanisms 2 also facilitates the semi-autonomous operation of the spacecraft according to mission requirements.

The general configuration of the aforementioned components enables a spacecraft to perform a predetermined mission semi-autonomously. As can be seen in FIGS. 1 through 10, the plurality of propulsion mechanisms 2 preferably utilizes a pneumatic system that enables the semi-autonomous operation of the spacecraft. Each of the plurality of propulsion mechanisms 2 comprises a solar sail assembly 3, a sail receptacle 11, a pneumatic actuator 14, and a quantity of fluid 19. The solar sail assembly 3 preferably corresponds to the structure that enables the deployment and retraction of the solar sails. The sail receptacle 11 corresponds to the structure that allows the retraction of the solar sail assembly 3 into the spherical hull 1. The pneumatic actuator 14 allows the deployment of the solar sail assembly 3. The quantity of fluid 19 enables the operation of the pneumatic actuator 14. The present invention can preferably be assembled as follows. The sail receptacle 11 for each of the plurality of propulsion mechanisms 2 is radially distributed about the spherical hull 1 so that several sail receptacles 11 are distributed about the spherical hull 1. In addition, the sail receptacle 11 for each of the plurality of propulsion mechanisms 2 is integrated into the spherical hull 1 to allow for the retraction of the solar sail assembly 3 of each of the plurality of propulsion mechanisms 2 into the spherical hull 1. For example, the sail receptacle 11 can be a round opening that allows access into the spherical hull 1. Further, the solar sail assembly 3 is mounted into the sail receptacle 11 to secure the solar sail assembly 3 to the sail receptacle 11 in such a way that the solar sail assembly 3 can retract into the spherical hull 1.

As can be seen in FIGS. 1 through 10, in addition, the pneumatic actuator 14 is operatively coupled to the solar sail assembly 3 so that the pneumatic actuator 14 can drive the operation of the solar sail assembly 3. The pneumatic actuator 14 is preferably a pressure-sensitive pneumatic actuator 14 that is used to deploy the solar sail assembly 3 out of the sail receptacle 11 and is also used to retract the solar sail assembly 3 into the sail receptacle 11. Further, the quantity of fluid 19 is retained by the pneumatic actuator 14 to enable the operation of the pneumatic actuator 14. The quantity of fluid 19 is preferably a fluid with physical properties that allow for the fluid to volumetrically expand in low-pressure conditions and to volumetrically contract in high-pressure conditions. Thus, the quantity of fluid 19 is configured to volumetrically expand in a low atmospheric pressure and to consequently deploy the solar sail assembly 3 out of the sail receptacle 11 with the pneumatic actuator 14. Likewise, the quantity of fluid 19 is also configured to volumetrically contract in a high atmospheric pressure and to consequently retract the solar sail assembly 3 into the sail receptacle 11 with the pneumatic actuator 14. Furthermore, in some embodiments, the pneumatic actuator 14 for each of the plurality of propulsion mechanisms 2 are in fluid communication amongst each other. This way, the quantity of fluid 19 can flow throughout the pneumatic actuators 14 to engage or disengage all the pneumatic actuator 14 simultaneously. In other embodiments, different pneumatic systems can be implemented into each of the plurality of propulsion mechanisms 2.

As previously discussed, the sail receptacle 11 enables the retraction of the solar sail assembly 3 into the spherical hull 1 as well as the deployment of the solar sail assembly 3 out of the spherical hull 1. As can be seen in FIGS. 1 through 10, the sail receptacle 11 may comprise a first open receptacle end 12 and a second open receptacle end 13 corresponding to opposite open ends of the sail receptacle 11 that allow the flow of the quantity of fluid 19 through the sail receptacle 11. In addition, the pneumatic actuator 14 may comprise a stretchable flexible piston membrane 15 and an elongated housing 16. The stretchable flexible piston corresponds to the structure that connects the solar sail assembly 3 to the pneumatic actuator 14. The elongated housing 16 corresponds to the structure that retains the quantity of fluid 19. Further, the elongated housing 16 comprises an open housing end 17 and a closed housing end 18 corresponding to the terminal ends of the elongated housing 16.

The pneumatic actuator 14 can be assembled as follows. As can be seen in FIGS. 6 through 10, the first open receptacle end 12 is positioned within the spherical hull 1 to receive the open housing end 17. On the other hand, the second open receptacle end 12 is positioned coincident with the spherical hull 1 to receive the stretchable flexible piston membrane 15. Further, the open housing end 17 is positioned adjacent to the first open receptacle end 12 to allow for the flow of the quantity of fluid 19 from the elongated housing 16 to the sail receptacle 11. On the other hand, the closed housing end 18 is positioned offset from the first open receptacle end 12 to provide enough holding space for the quantity of fluid 19. Further, the stretchable flexible piston membrane 15 is hermetically connected in between the first open receptacle end 12 and the open housing end 17 to secure the stretchable flexible piston membrane 15 to the sail receptacle 11. Furthermore, the quantity of fluid 19 is enclosed with the stretchable flexible piston membrane 15 and the elongated housing 16. This way, the quantity of fluid 19 can flow through the elongated housing 16 and the sail receptacle 11. In addition, the solar sail assembly 3 is connected onto the stretchable flexible piston membrane 15 to secure the solar sail assembly 3 to the stretchable flexible piston membrane 15.

The solar sail assembly 3 is designed to be retractable so that the entire solar sail assembly 3 can retract into the spherical hull 1. As can be seen in FIGS. 1 through 10, the solar sail assembly 3 may comprise at least one solar sail 4, at least one sail boom 5, and a sail mast 8. The at least one solar sail 4 corresponds to the structure that allows the spacecraft to propel and maneuver using radiation pressure. The at least one sail boom 5 corresponds to the structure that allows the retraction and deployment of the at least one solar sail 4. Further, the sail mast 8 connects the solar sail assembly 3 to the stretchable flexible piston membrane 15. The at least one sail boom 5 is an elongated structure that allows the controlled deployment of the at least one solar sail 4. The at least one sail boom 5 comprises a proximal boom end 6 and a distal boom end 7 corresponding to the terminal ends of the at least one sail boom 5. Further, the sail mast 8 is an elongated tubular structure long enough to offset the at least one solar sail 4 from the spherical hull 1 when deployed. The sail mast 8 comprises a first mast end 9 and a second mast end 10 corresponding to the terminal ends of the sail mast 8. The solar sail assembly 3 can preferably be assembled as follows. The sail mast 8 is positioned normal to the stretchable flexible membrane so that the solar sail assembly 3 is also positioned normal to the spherical hull 1 when deployed. In addition, the first mast end 9 is centrally connected to the stretchable flexible piston membrane 15 to secure the solar sail assembly 3 to the stretchable flexible piston membrane 15. Similarly, the proximal boom end 6 is laterally mounted to the sail mast 8, adjacent to the second mast end 10, to secure the at least one solar sail 4 to the sail mast 8. The distal boom end 7 is positioned offset from the sail mast 8 to fully expand the at least one solar sail 4 when deployed. Furthermore, the at least one solar sail 4 is connected along the at least one sail boom 5 to secure the at least one solar sail 4 to the sail mast 8. In other embodiments, the solar sail assembly 3 can be modified to meet specific mission requirements.

In the preferred embodiment, the solar sail assembly 3 is deployed out of the spherical hull 1 in low atmospheric pressure conditions. As can be seen in FIGS. 1 through 3 and 6 through 10, in a deployed configuration, the stretchable flexible piston membrane 15 traverses from the first open receptacle end 12, through the sail receptacle 11, and out of the second open receptacle end 13 to position the stretchable flexible piston membrane 15 external to the spherical hull 1. As the stretchable flexible piston membrane 15 is positioned external to the spherical hull 1, the solar sail assembly 3 is also positioned external to the spherical hull 1 to propel the spacecraft. Further, the solar sail assembly 3 is positioned offset from the sail receptacle 11 as the stretchable flexible piston membrane 15 is expanded outside the spherical hull 1. Furthermore, the stretchable flexible piston membrane 15 is preferably a conical shape. A vertex 21 of the conical shape is also positioned external to the spherical hull 1, and the first mast end 9 is connected to the vertex 21. In other embodiments, the stretchable flexible piston membrane 15 can be designed with different shapes.

Figure 4:
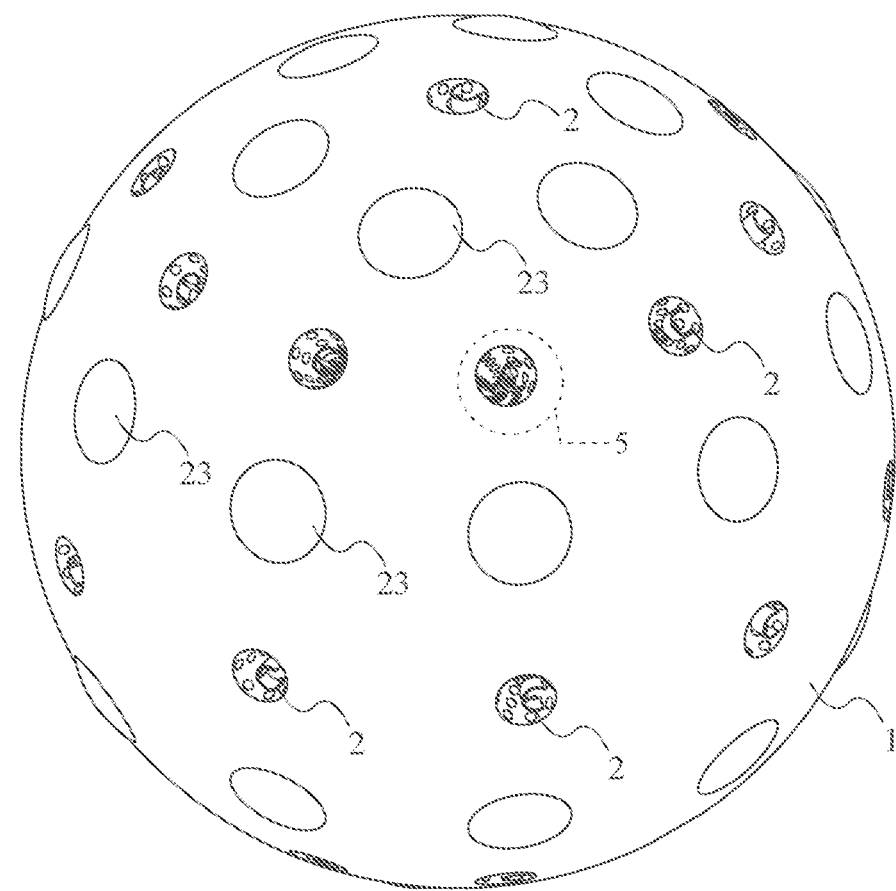
FIG. 4 is a top front perspective view of the present invention, wherein the plurality of propulsion mechanisms of the present invention are shown in a retracted configuration.
Figure 5:
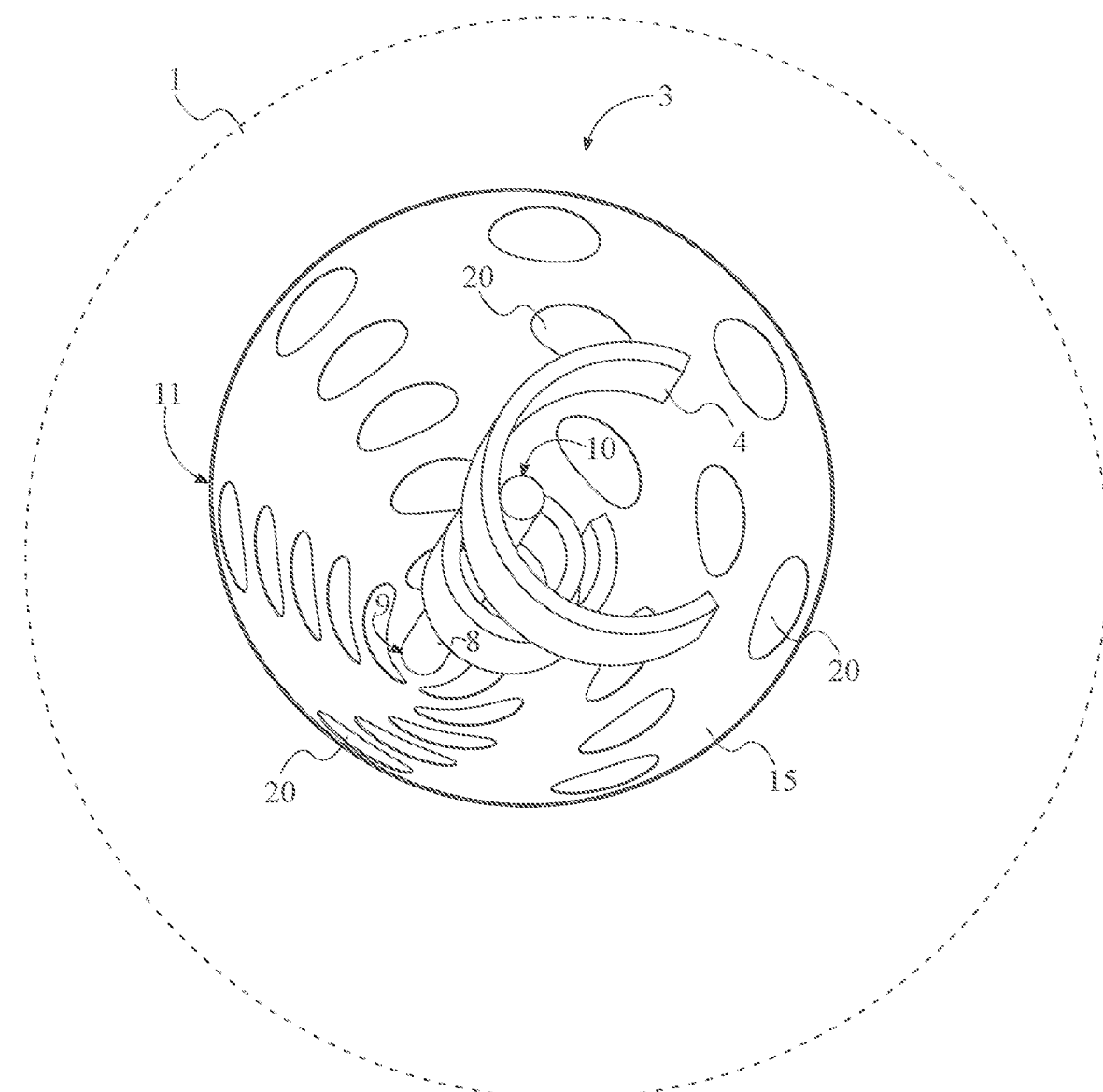
FIG. 5 is a magnified view of a propulsion mechanism of the plurality of propulsion mechanisms shown in FIG. 4.
Figure 6:
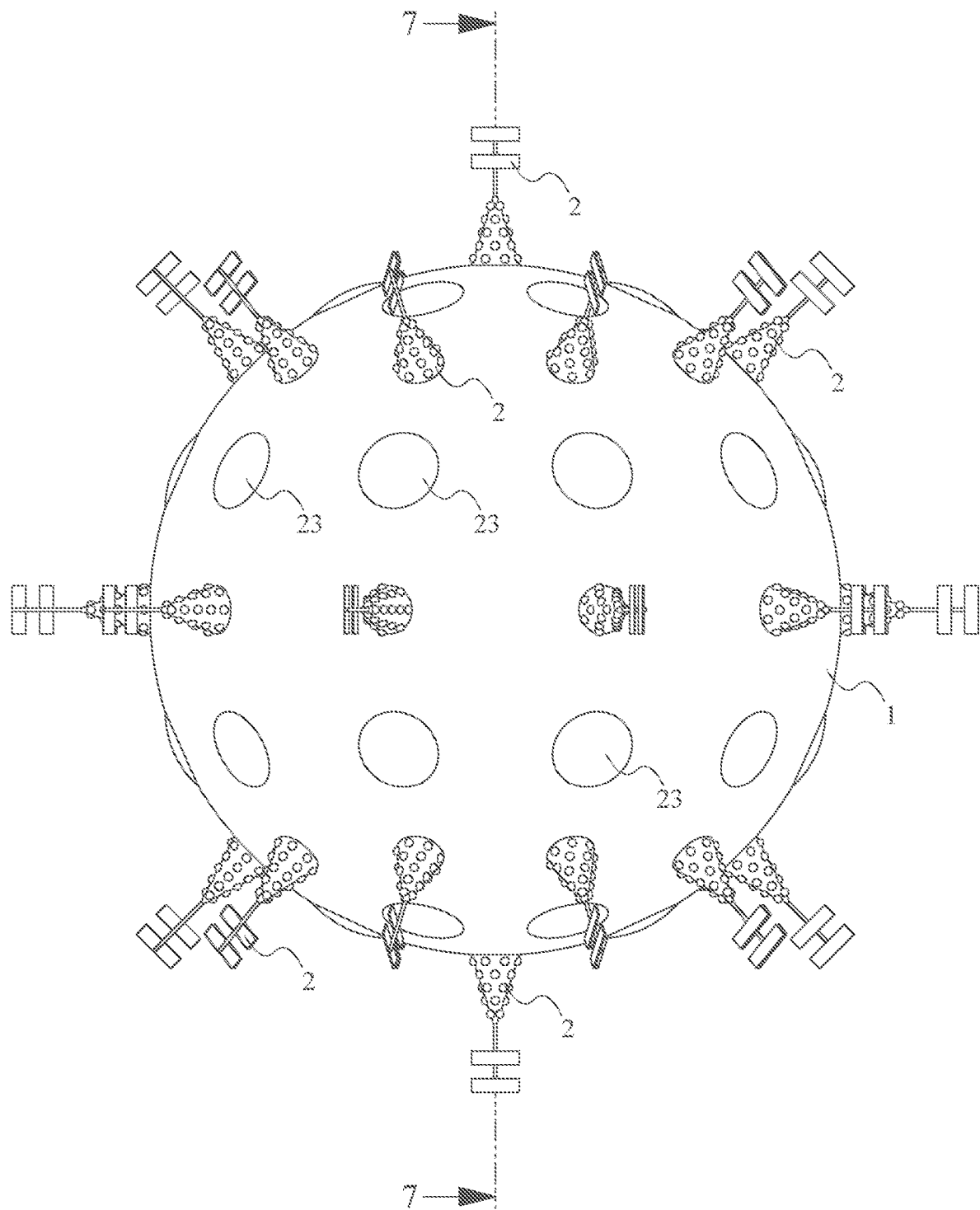
FIG. 6 is a front view of the present invention, wherein the plurality of propulsion mechanisms of the present invention are shown in the deployed configuration.
Figure 7:
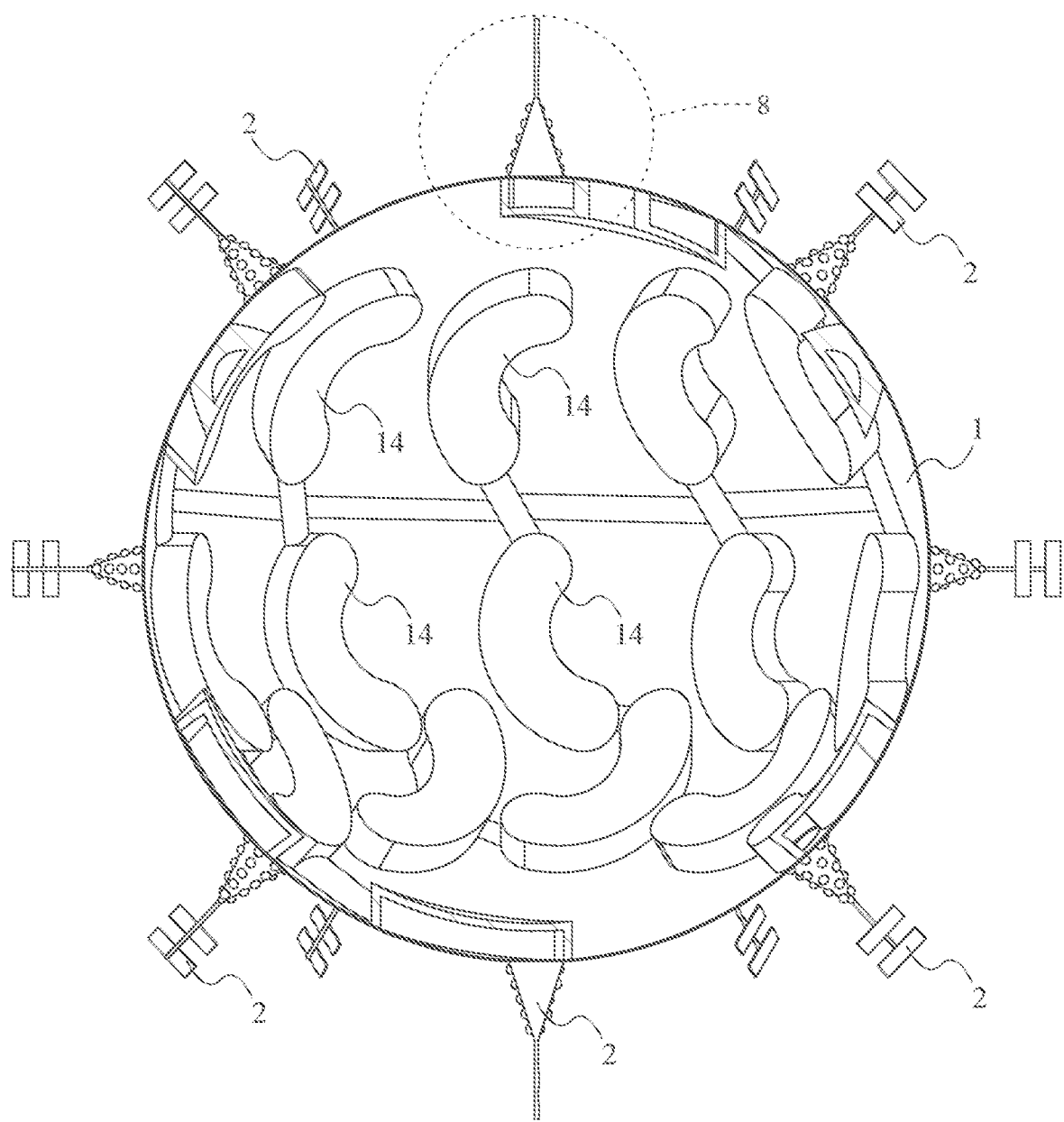
FIG. 7 is a vertical cross-sectional view taken along line 7-7 in FIG. 6.
Figure 8:
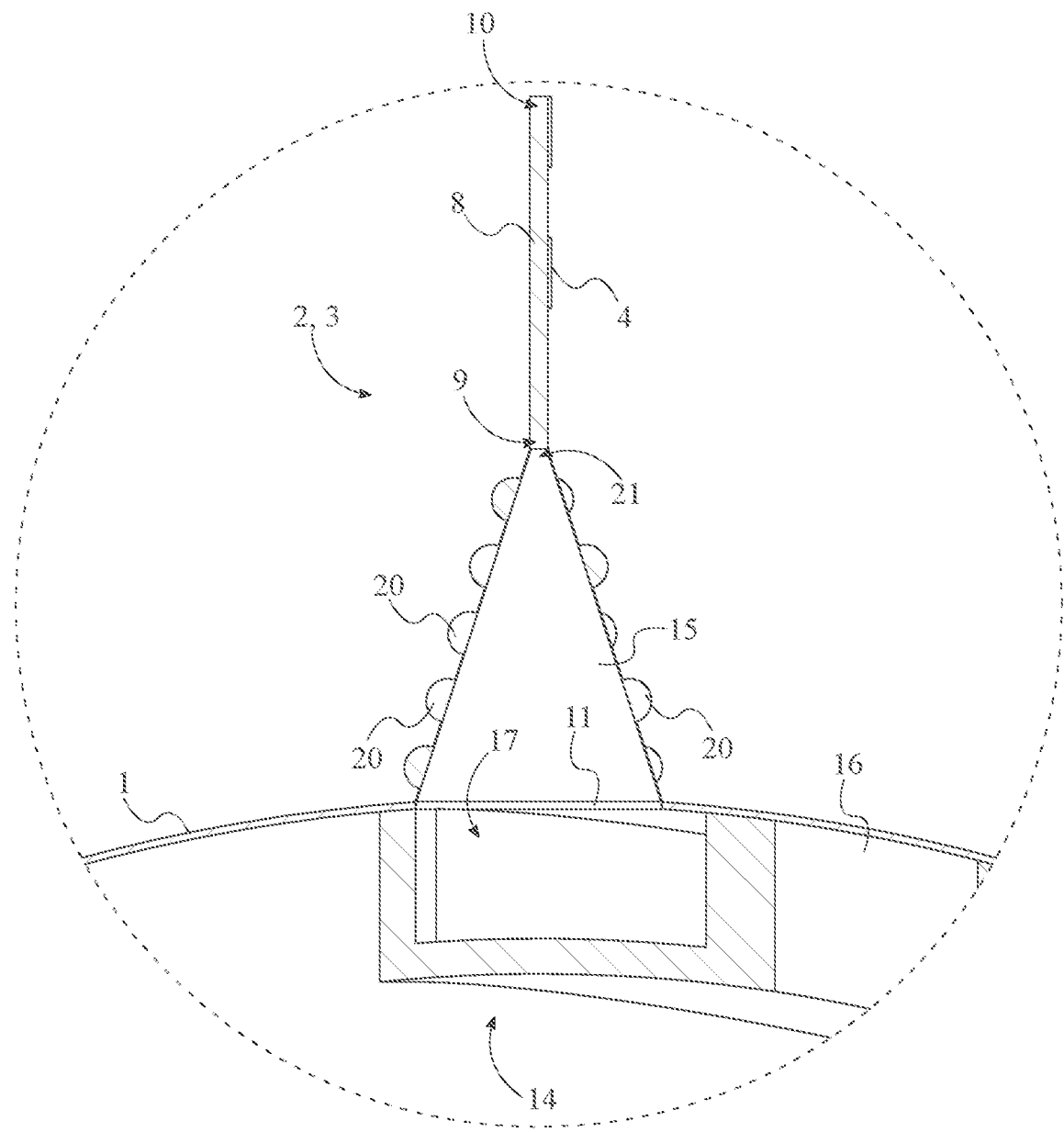
FIG. 8 is a magnified view of a propulsion mechanism of the plurality of propulsion mechanisms shown in FIG. 7.
Figure 9:
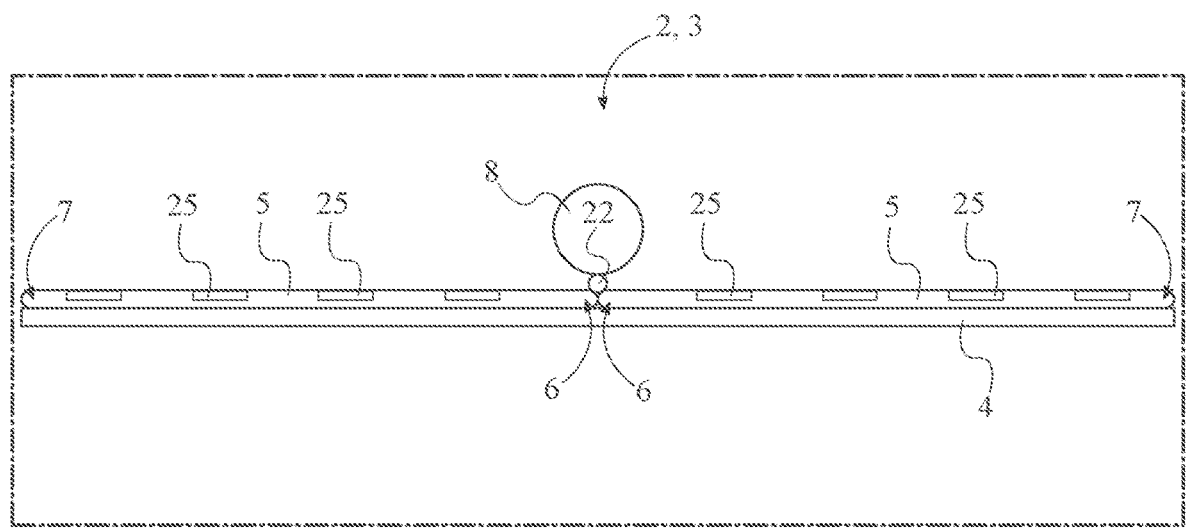
FIG. 9 is a top schematic view of a solar sail assembly of a propulsion mechanism of the present invention, wherein the propulsion mechanism is shown in the deployed configuration.

In the preferred embodiment, the solar sail assembly 3 is retracted into the spherical hull 1 in high atmospheric pressure conditions. As can be seen in FIGS. 4 and 5, in the retracted configuration, the stretchable flexible piston membrane 15 is positioned in between the first open receptacle end 12 and the open housing end 17. When the stretchable flexible piston membrane 15 is positioned within the spherical hull 1, the solar sail assembly 3 is also positioned within the sail receptacle 11. Further, the at least one sail boom 5 is a flexible rod that allows the flexible rod to be bent so that the flexible rod can be positioned along an interior of the sail receptacle 11. Furthermore, the proximal boom end 6 is laterally connected to the sail mast 8 by a spring hinge 22 that allows the at least one solar sail 4 to be retracted and deployed. In addition, in the retracted configuration, the at least one sail boom 5 is oriented into being positioned along an interior of the sail receptacle 11.

Figure 10:
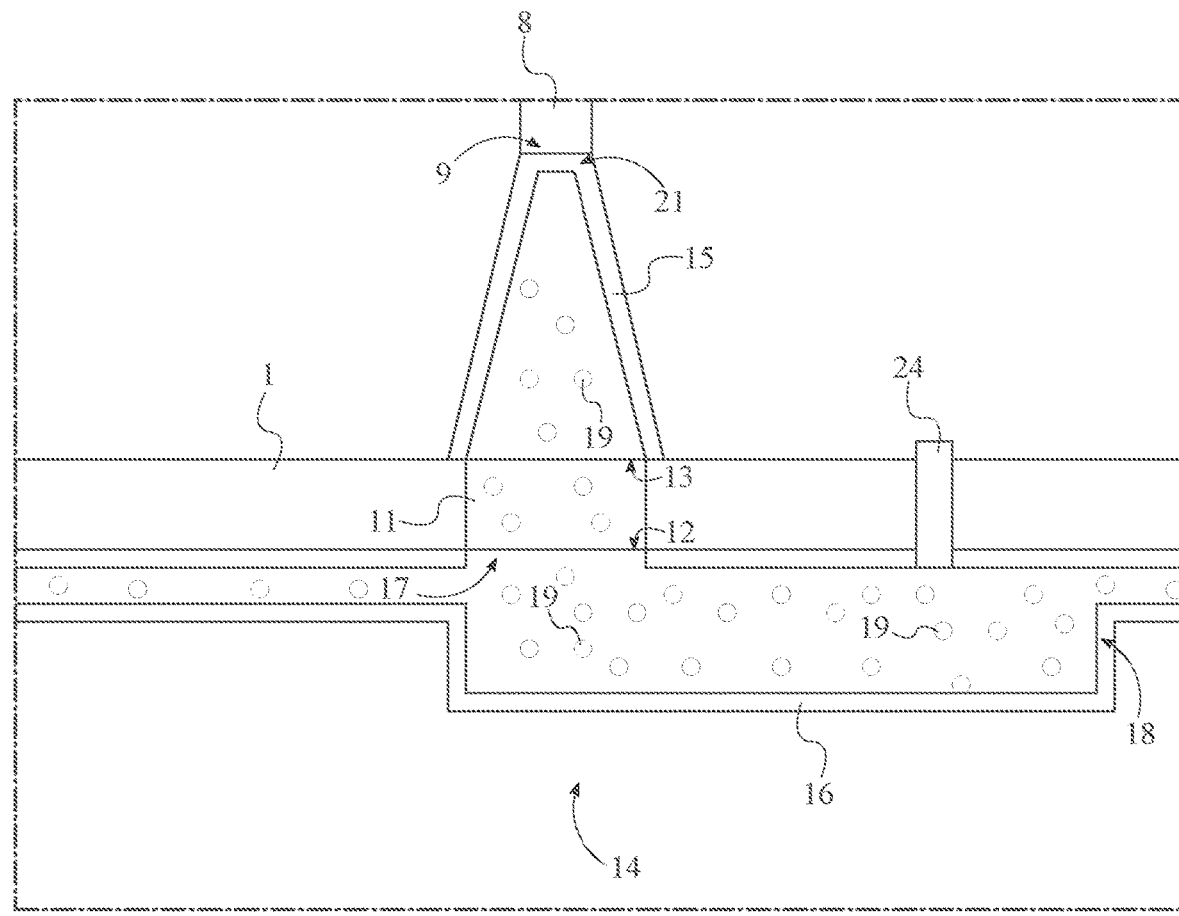
FIG. 10 is a side schematic view of a solar sail assembly, a sail receptacle, a pneumatic actuator, and a quantity of fluid of a propulsion mechanism of the present invention, wherein the propulsion mechanism is shown in the deployed configuration.

In addition, as can be seen in FIG. 10, to facilitate the retraction of the solar sail assembly 3 into the spherical hull 1, the solar sail assembly 3 may further comprise a magnetic attachment mechanism 25. The magnetic attachment mechanism 25 may include several magnets that can be distributed throughout the solar sail assembly 3 so that when the pressure within the corresponding pneumatic actuator 14 is released, the solar sail assembly 3 is forced back into the spherical hull 1. This way, the at least one sail boom 5 can be attached along the sail mast 8 by the magnetic attachment mechanism 25. In other embodiments, different attachment mechanisms can be included to facilitate the retraction of the solar sail assembly 3 into the spherical hull 1.

In the preferred embodiment, the present invention can include means to protect the retractable components during operation. As can be seen in FIGS. 1 through 8, each of the plurality of propulsion mechanisms 2 may further comprise a plurality of mechanism cushions 20 that can be deployed and retracted along with the rest of the solar sail assembly 3. To protect the retractable components of each of the plurality of propulsion mechanisms 2, the plurality of mechanism cushions 20 is positioned external to the pneumatic actuator 14. In addition, the plurality of mechanism cushions 20 is mounted onto and across the stretchable flexible piston membrane 15 to provide the most cushioning to the retractable components of each of the plurality of propulsion mechanisms 2. Furthermore, each of the plurality of mechanism cushions 20 can be a fluid-filled bag. In other embodiments, different cushioning mechanisms can be implemented.

In addition to the plurality of mechanism cushions 20, the present invention may further comprise a plurality of hull cushions 23 that protect the spacecraft during landing, as can be seen in FIGS. 1 through 8. The plurality of hull cushions 23 is radially distributed about the spherical hull 1 to provide the greatest protection to the spherical hull 1 from external objects. In addition, the plurality of hull cushions 23 is interspersed amongst the plurality of propulsion mechanisms 2 so that the plurality of hull cushions 23 do not obstruct with the plurality of propulsion mechanisms 2. Further, the plurality of hull cushions 23 is mounted external to the spherical hull 1 to secure each of the plurality of hull cushions 23 to the spherical hull 1. Furthermore, like the plurality of propulsion mechanisms 2, each of the plurality of hull cushions 23 is a fluid-filled bag. In other embodiments, the present invention can include different cushioning mechanisms that protect the spacecraft.

As previously discussed, each of the plurality of propulsion mechanisms 2 is designed to retract the solar sail assembly 3 into the spherical hull 1 in high atmospheric pressure. However, if specific solar sail assemblies need to be retracted into the spherical hull 1, each of the plurality of propulsion mechanisms 2 may further comprising a release valve 24 that allows the retained quantity of fluid 19 to be released, as can be seen in FIG. 10. The release valve 24 is integrated into the spherical hull 1 to allow the release of the quantity of fluid 19 from within the elongated housing 16 of the corresponding pneumatic actuator 14 to retract the desired solar sail assembly 3 into the spherical hull 1. In addition, the release valve 24 is in fluid communication with the pneumatic actuator 14 to allow for the quantity of fluid 19 to flow out of the elongated housing 16 when necessary. In other embodiments, different mechanisms can be incorporated into each of the plurality of propulsion mechanisms 2 to facilitate the controlled deployment and retraction of the solar sail assemblies.

Although the invention has been explained in relation to its preferred embodiment, it is to be understood that many other possible modifications and variations can be made without departing from the spirit and scope of the invention.

What is claimed is:
1. A spacecraft with retractable solar sails comprising:
a spherical hull;
a plurality of propulsion mechanisms;
each of the plurality of propulsion mechanisms comprising a solar sail assembly, a sail receptacle, a pneumatic actuator, and a quantity of fluid;
the sail receptacle for each of the plurality of propulsion mechanisms being radially distributed about the spherical hull;
the sail receptacle for each of the plurality of propulsion mechanisms being integrated into the spherical hull;

the solar sail assembly being mounted into the sail receptacle;
the pneumatic actuator being operatively coupled to the solar sail assembly, wherein the pneumatic actuator is used to deploy the solar sail assembly out of the sail receptacle and is used to retract the solar sail assembly into the sail receptacle;
the quantity of fluid being retained by the pneumatic actuator;
the quantity of fluid being configured to volumetrically expand in a low atmospheric pressure and to consequently deploy the solar sail assembly out of the sail receptacle with the pneumatic actuator; and
the quantity of fluid being configured to volumetrically contract in a high atmospheric pressure and to consequently retract the solar sail assembly into the sail receptacle with the pneumatic actuator.

2. The spacecraft with retractable solar sails as claimed in claim 1 comprising:
the sail receptacle comprising a first open receptacle end and a second open receptacle end;
the pneumatic actuator comprising a stretchable flexible piston membrane and an elongated housing;
the elongated housing comprising an open housing end and a closed housing end;
the first open receptacle end being positioned within the spherical hull;
the second open receptacle being positioned coincident with the spherical hull;
the open housing end being positioned adjacent to the first open receptacle end;
the closed housing end being positioned offset from the first open receptacle end;
the stretchable flexible piston membrane being hermetically connected in between the first open receptacle end and the open housing end;
the quantity of fluid being enclosed with the stretchable flexible piston membrane and the elongated housing; and
the solar sail assembly being connected onto the stretchable flexible piston membrane.

3. The spacecraft with retractable solar sails as claimed in claim 2 comprising:
the solar sail assembly comprising at least one solar sail, at least one sail boom, and a sail mast;
the at least one sail boom comprising a proximal boom end and a distal boom end;
the sail mast comprising a first mast end and a second mast end;
the sail mast being positioned normal to the stretchable flexible membrane;
the first mast end being centrally connected to the stretchable flexible piston membrane;
the proximal boom end being laterally mounted to the sail mast, adjacent to the second mast end;
the distal boom end being positioned offset from the sail mast; and
the at least one solar sail being connected along the at least one sail boom.

4. The spacecraft with retractable solar sails as claimed in claim 3 comprising:
wherein the solar sail assembly and the pneumatic actuator are arranged into a deployed configuration;
the stretchable flexible piston membrane traversing from the first open receptacle end, through the sail receptacle, and out of the second open receptacle end;
the solar sail assembly being positioned external to the spherical hull;
the solar sail assembly being positioned offset from the sail receptacle; and
the at least one sail boom being positioned perpendicular to the at least one sail mast.

5. The spacecraft with retractable solar sails as claimed in claim 4, wherein the stretchable flexible piston membrane is a conical shape, and wherein a vertex of the conical shape is positioned external to the spherical hull, and wherein the first mast end is connected to the vertex.

6. The spacecraft with retractable solar sails as claimed in claim 3 comprising:
wherein the solar sail assembly and the pneumatic actuator are arranged into a retracted configuration;
the stretchable flexible piston membrane being positioned in between the first open receptacle end and the open housing end; and
the solar sail assembly being positioned within the sail receptacle.

7. The spacecraft with retractable solar sails as claimed in claim 6, wherein the at least one sail boom is a flexible rod, and wherein the flexible rod is bent into being positioned along an interior of the sail receptacle.

8. The spacecraft with retractable solar sails as claimed in claim 6, wherein the proximal boom end is laterally connected to the sail mast by a spring hinge, and wherein the at least one sail boom is oriented into being positioned along an interior of the sail receptacle.

9. The spacecraft with retractable solar sails as claimed in claim 6 comprising:
the solar sail assembly further comprising a magnetic attachment mechanism; and
the at least one sail boom being attached along the sail mast by the magnetic attachment mechanism.

10. The spacecraft with retractable solar sails as claimed in claim 2 comprising:
each of the plurality of propulsion mechanisms further comprising a plurality of mechanism cushions;
the plurality of mechanism cushions being positioned external to the pneumatic actuator; and
the plurality of mechanism cushions being mounted onto and across the stretchable flexible piston membrane.

11. The spacecraft with retractable solar sails as claimed in claim 10, wherein each of the plurality of mechanism cushions is a fluid-filled bag.

12. The spacecraft with retractable solar sails as claimed in claim 2, wherein the pneumatic actuator for each of the plurality of propulsion mechanisms are in fluid communication amongst each other.

13. The spacecraft with retractable solar sails as claimed in claim 1 comprising:
a plurality of hull cushions;
the plurality of hull cushions being radially distributed about the spherical hull;
the plurality of hull cushions being interspersed amongst the plurality of propulsion mechanisms; and
the plurality of hull cushions being mounted external to the spherical hull.

14. The spacecraft with retractable solar sails as claimed in claim 13, wherein each of the plurality of hull cushions is a fluid-filled bag.

15. The spacecraft with retractable solar sails as claimed in claim 1 comprising:
each of the plurality of propulsion mechanisms further comprising a release valve;

the release valve being integrated into the spherical hull; and the release valve being in fluid communication with the pneumatic actuator.

* * * * *